G. M. HALL.
RACK.
APPLICATION FILED JUNE 15, 1917.

1,276,905.

Patented Aug. 27, 1918.
2 SHEETS—SHEET 1.

Inventor
George Morgan Hall
By Moulton & Livrance
Attorneys.

G. M. HALL.
RACK.
APPLICATION FILED JUNE 15, 1917.

1,276,905.

Patented Aug. 27, 1918.
2 SHEETS—SHEET 2.

Inventor
George Morgan Hall
By Moulton & Lurance
Attorneys.

UNITED STATES PATENT OFFICE.

GEORGE MORGAN HALL, OF GRAND RAPIDS, MICHIGAN, ASSIGNOR TO HALL CANNER COMPANY, OF GRAND RAPIDS, MICHIGAN, A CORPORATION OF MICHIGAN.

RACK.

1,276,905.　　　　　Specification of Letters Patent.　　Patented Aug. 27, 1918.

Application filed June 15, 1917. Serial No. 174,929.

*To all whom it may concern:*

Be it known that I, GEORGE MORGAN HALL, a citizen of the United States of America, residing at Grand Rapids, in the county of Kent and State of Michigan, have invented certain new and useful Improvements in Racks; and I do hereby declare the following to be a full, clear, and exact description of the invention, such as will enable others skilled in the art to which it appertains to make and use the same.

Figure 1:
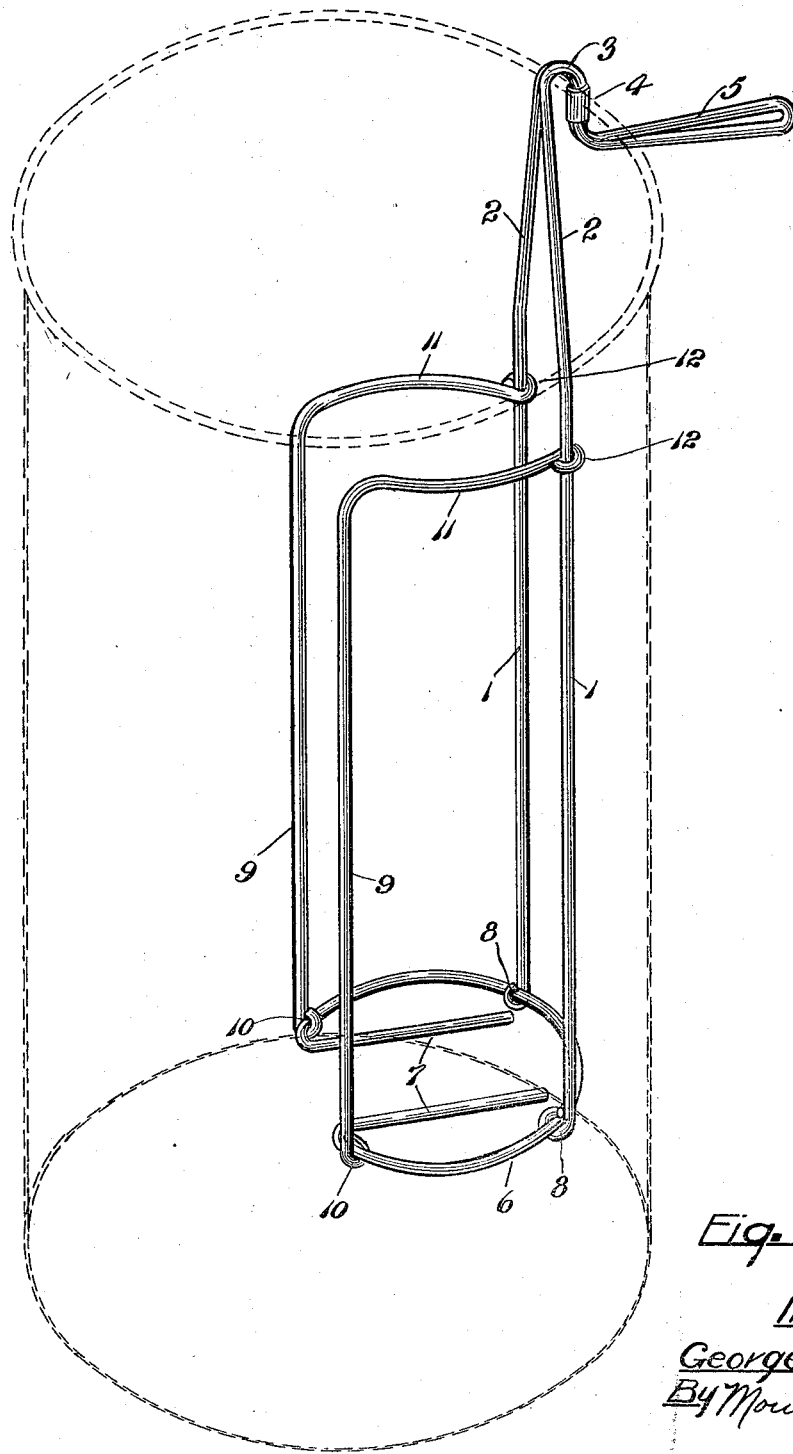
Figure 2:
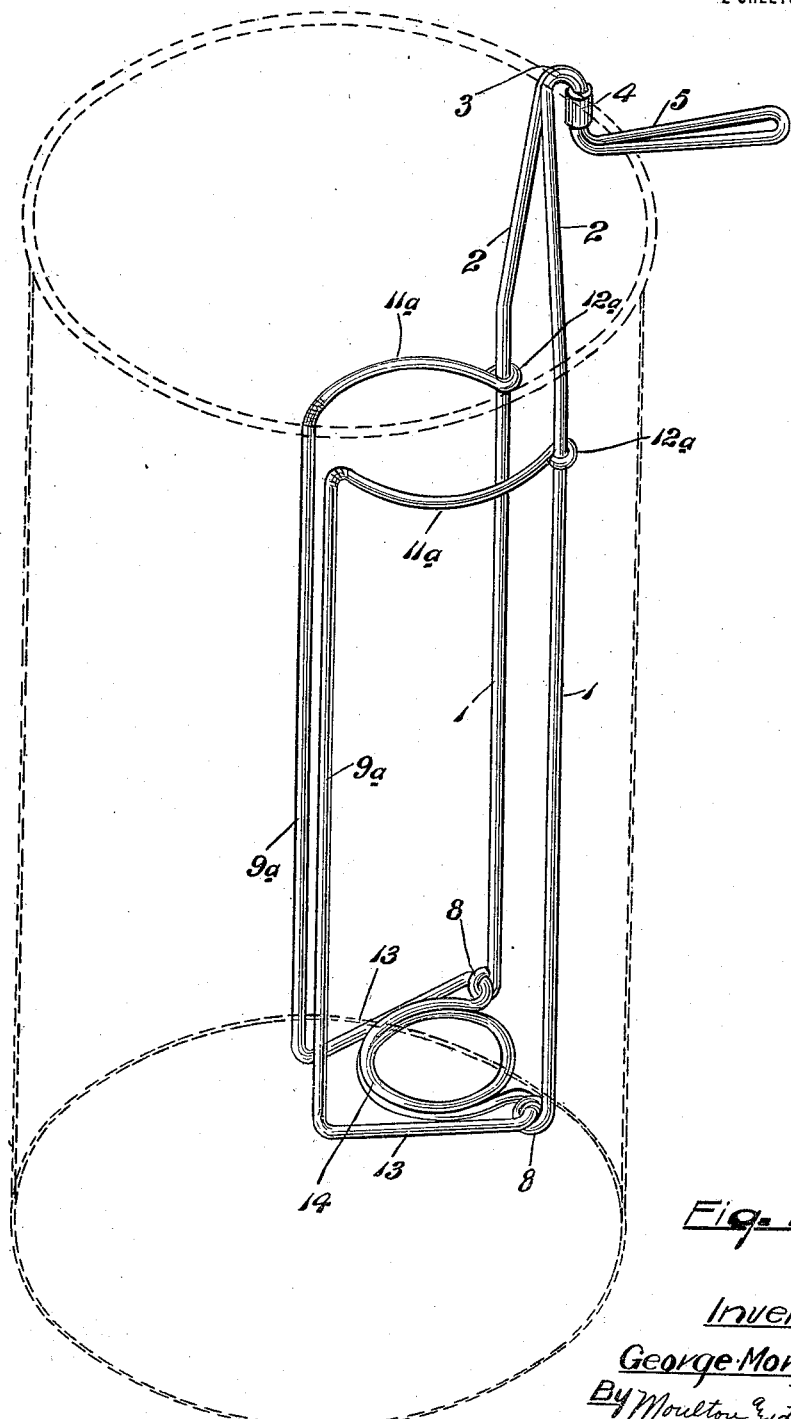

This invention relates to a rack adapted particularly to hold jars or cans for ready immersing in or removal of the same from boiling water in a receptacle, in the process of cooking the contents within the jars. It is an object and purpose of the present invention to make a very simple and economical holder or rack which will hold jars of various sizes and clasp the same so as to hold them upright without danger that any jars shall tilt to one side, there being provided means in the construction for yieldingly contracting or expanding the jar holding means to adapt it for different diameters of jars. A further object of the invention consists in the provision of a novel construction of rack which shall include an engaging means whereby it may be engaged with the upper edge of a side of a receptacle adapted to contain water heated to a high degree of temperature, the rack also including an outwardly extending handle which projects far enough from the container that its temperature will not be unduly raised, whereby the rack may be readily handled without danger of burning. A still further object of the invention consists in a novel construction of the rack entirely from wire whereby a very economical yet durable and efficient rack for holding jars may be produced. All of these various features of novelty and utility will be apparent as understanding of the invention is had from the following description and drawing showing the construction in which;

Figures 1 and 2 illustrate two modifications of the rack in perspective and show the method of removable attachment to a can or container which is shown in dotted outline.

In the construction of the rack as shown in Fig. 1 a member is made from a length of wire which is bent midway between its ends each end terminating in a vertical standard 1 of considerable length. The upper ends of said standards are converged toward each other as indicated at 2 and then formed into a U-shaped loop 3 opened on its under side. A clip, such as 4, may be passed around the wires adjacent the loop to preclude their separation. The upper leg of the loop is then bent outwardly and substantially horizontal to make a handle 5 which may be of any desired length sufficient, however, that when the device as a whole is attached to the container the handle will project a considerable distance therefrom. It will be noted that the handle 5 is in the form of a loop the piece of wire from which the member is made being bent at its middle point at the end of the handle.

A second member or base of wire is used and is bent into substantially circular form as indicated at 6. The circle is not completed, however, but the ends of the wire at 7 are turned inwardly and positioned in the plane of the circle substantially parallel to each other and spaced apart as shown. The lower ends of the standards 1 are turned around parts of the circle as indicated at 8 making an inseparable connection therewith.

The rack is completed by two additional members formed of wire each having a vertical portion 9 located in front of and paralleling the vertical standards 1. Each portion 9 at its lower end is connected with the base member 6 by turning the ends of said portions 9 around said member as indicated at 10. The vertical portions 9 extend upwardly to a point a short distance below the converging portions 2 of standards 1 and each is then bent inwardly toward the standards 1 as indicated at 11, the ends of the portions 11 being turned around standards 1 as indicated at 12. It will also be observed that each section 11 is curved to conform substantially to the circular base 6 below it.

A rack of the character described is adapted to receive jars or cans in which fruit or other edibles may be preserved. The base 6 may have its shape changed and varied being yieldable either to expand or contract as is obvious. And by reason of this feature the vertical portions 9 may be adjusted with respect to each other so as to receive different sizes of cans and clasp the same against the standards 1. Further the U-shaped loop 3 open on its under side permits the attachment of the rack as a whole to the upper edge of the side of a can or container such as is indicated in dotted outline. This can or container may hold water heated to a high degree of temperature and the rack with jars therein may be immersed in the water for cooking the contents of the jars. The outwardly extending handle 5 is of utility in handling the rack by reason of its extension to a distance away from the can or container, whereby its temperature is not unduly raised and it is not necessary to come into close contact with the boiling water within the can in handling the rack. All of these features make the rack one of special utility and value and by reason of the construction from wire as described the same may be produced at a very low cost of manufacture. It is, of course, understood that the connections at 8, 10 and 12 may be made rigid as by solder or otherwise.

In Fig. 2 a modification in structure is shown and one which for some reasons is preferred. In this construction the member consisting of vertical standards 1 with loops 8 at their lower ends, the standards converging at their upper ends and formed into a U-shaped loop 3 open on the under side thereof and provided with an outwardly extending handle 5, is the same in all respects as that shown in Fig. 1, except that the standards are farther apart. The rack is completed in this construction by the addition of a single piece of wire bent into a special and particular formation as shown. The two extreme ends of the wire are formed into loops 12ª which pass around and connect with the standards 1, the same as do the loops 12 in the construction shown in Fig. 1, thence being fashioned into curved arms 11ª which extend outwardly for a distance, at their outer ends coming closer together than do the outer ends of the similar portions 11 in the first construction. From the front ends of portions 11 the wires are bent downwardly to form vertical portions 9ª, similar to the portions 9 previously described, which, at their lower ends are bent backwardly to provide horizontal portions 13 which lead to and through loops 8, the wire between portions 13 being formed into a spring coil 14 the tendency of which is to carry the vertical sections 9ª toward each other. It is apparent that if the portions 9ª are separated by the insertion of a jar or can of relatively large diameter, the tendency of spring 12 is to cause them to return to their first position on removal of the jar or can.

This construction of rack requires but two pieces of wire and coil 14 serves as a base or stop to prevent any jar or can passing through the lower end of the rack.

I claim:—

1. In combination, a rack comprising a member formed from a single piece of wire bent at its middle to form a handle, the wires of the handle coming together at their inner ends and then formed into an inverted U-shaped bend, and thence diverging and extending downwardly to make two spaced apart vertical standards, a base normally lying in a horizontal plane and open at one side to which the lower ends of said standards are secured at a side opposite said open side, said base being yieldingly expansible at said open side whereby the opening may be enlarged, and members extending upwardly from and connected to the base at each side of the opening and connected at their upper ends to said standards, said members moving away from each other as the base is expanded, whereby the vertical standards and said members are adapted to receive various sizes of jars or the like between them, substantially as described.

2. In combination, a rack comprising two wire members, the first member including two spaced apart vertical standards, and the second member including two spaced apart vertical wire portions located in front of the vertical wire standards of the first member, a base including a spring coil interposed between the lower ends of said standards and vertical portions of the second member, said base being formed integrally with and from the same piece of wire as said vertical portions, connections between the lower ends of said standards and the base, and horizontal portions bent at the upper ends of said vertical wire portions and connected at the ends to said standards, substantially as described.

3. In combination, a rack comprising a member formed from a single piece of wire bent at its middle to form a horizontal handle, the wires of the handle coming together at their inner ends and then formed into an inverted U-shaped bend, and thence diverging and extending downwardly to make two spaced apart vertical standards, a second wire member formed from a single piece of wire formed at its middle into a horizontally positioned spring coil and thence having horizontal portions extending one along each side of the coil for a distance and thence bent upwardly to form spaced apart vertical wire portions, each at its upper end bent back to form a horizontal wire portion, said second member being located in front of the first member, connections between the lower ends of said vertical standards and the rear portion of the base, and connections between said upper horizontal portions of the second member and said standards, substantially as described.

4. In combination, a rack, comprising a member formed of wire and including two spaced apart vertical standards, a yieldingly expanding and contracting base member to one side of which the lower ends of the standards are connected, and vertical wire portions extending in spaced apart relation from the opposite side of the base member, horizontal wire portions being bent from the upper ends of said vertical portions toward said standards and connected thereto at the ends of said horizontal portions, said vertical portions having connection to the base and moving away from and toward each other as the base is expanded and contracted, substantially as described.

5. In combination, a rack including a vertical supporting member, a yieldingly expanding and contracting base member to one side of which the supporting member is connected at its lower end, vertical wire portions extending in spaced apart relation from the opposite side of the base member, horizontal wire portions being bent from the upper ends of said vertical portions toward said supporting member and connected thereto, said vertical portions having connection to the base and moving away from and toward each other, as the base is expanded and contracted and the parts thereof with which said vertical portions are connected move away from and toward each other, substantially as described.

6. In combination, a rack comprising a member formed from a single piece of wire bent at its middle to form a horizontal handle, the wires of the handle coming together at their inner ends and formed into an inverted U-shaped bend, and thence diverging and extending downwardly to make two spaced apart vertical standards, a base located in a horizontal plane to one side of which the lower ends of said standards are connected, said base extending from the standards in a direction opposite to the extension of the handle, and members extending upwardly from and connected to the opposite side of the base at their lower ends and to the standards at their upper ends, the standards and said members being adapted to receive different sizes of jars or the like between them, substantially as described.

In testimony whereof I affix my signature.

GEORGE MORGAN HALL.

Copies of this patent may be obtained for five cents each, by addressing the "Commissioner of Patents, Washington, D. C."